Aug. 26, 1952 — A. BRIECHLE — 2,608,407
COPY TABLE FOR DOCUMENT PHOTOGRAPHING MACHINES
Original Filed March 27, 1944 — 8 Sheets-Sheet 1

Fig. 1

INVENTOR
Ambrosius Briechle
BY
ATTORNEYS

Aug. 26, 1952     A. BRIECHLE     2,608,407
COPY TABLE FOR DOCUMENT PHOTOGRAPHING MACHINES
Original Filed March 27, 1944     8 Sheets-Sheet 3

INVENTOR
Ambrosius Briechle
BY
ATTORNEYS

Aug. 26, 1952  A. BRIECHLE  2,608,407
COPY TABLE FOR DOCUMENT PHOTOGRAPHING MACHINES
Original Filed March 27, 1944  8 Sheets-Sheet 4

INVENTOR
Ambrosius Briechle
BY
ATTORNEYS

Aug. 26, 1952　　　　A. BRIECHLE　　　　2,608,407
COPY TABLE FOR DOCUMENT PHOTOGRAPHING MACHINES
Original Filed March 27, 1944　　　　　　　　　8 Sheets-Sheet 7

INVENTOR
Ambrosius Briechle
BY
ATTORNEYS

Aug. 26, 1952  A. BRIECHLE  2,608,407
COPY TABLE FOR DOCUMENT PHOTOGRAPHING MACHINES
Original Filed March 27, 1944  8 Sheets-Sheet 8

INVENTOR
Ambrosius Briechle
ATTORNEYS

Patented Aug. 26, 1952

2,608,407

UNITED STATES PATENT OFFICE 2,608,407

COPY TABLE FOR DOCUMENT PHOTOGRAPHING MACHINES

Ambrosius Briechle, Brooklyn, N. Y., assignor to Remington Rand Inc., New York, N. Y., a corporation of Delaware Original application March 27, 1944, Serial No. 528,221. Divided and this application January 29, 1948, Serial No. 5,053

11 Claims. (Cl. 271—45)

The present invention is directed to improvements in a machine for photographing documents, particularly to a copy table providing a photographing position and feeding means for the documents.

This application is a division of application Serial No. 528,221, filed March 27, 1944.

The copy table constructed according to the present invention comprehends the provision of a machine in which the documents may be fed automatically through a photographing position in making positive photographic copies on a sensitized strip wherein more than one copy of such documents may be produced without changing the rate of feed of documents through the photographing position; and in providing a machine where feed ratios between the document feed and the strip feed of the photographing machine with which the invention is operatively associated, can be readily made without interchanging parts, and having means for interconnecting and controlling the document and sensitized strip feeds to provide one complete cycle of operation to photograph a document for each manual operation of the control mechanism.

The invention further provides, a copy table formed to furnish a photographing position for documents with feeding means to feed documents through the photographing position on said table, so that without interchange of parts, adjustments of the copy table can be readily made to bring documents of various sizes within the range of the machine and into proper photographing position on the copy table for photographing on the sensitized strip in the said associated photographing machine, without waste of sensitized material; the provision of control means for the coordinated operation of the copy table and associated photographing machine arranged to provide a manually operated control adapted to release the combined machine for one cycle of operation upon each manual operation of the control means; and the provision of an auxiliary control for a movable cover plate used to hold documents flat on the copy table in photographing position operable independently of the control means to stop copy feed on the copy table when it is desired to produce duplicate copies that may not be produced in a shifted position of the copy table.

There are other features involved in the copy table that facilitate its construction, operation and adjustment in making positive reading photographic copies of documents that will be hereinafter more clearly pointed out in describing the structure and operation of said copy table.

The general construction of the document photographing machine employing the present invention is fully disclosed in copending application Serial No. 528,221, filed March 27, 1944, and the said general construction is illustrated and described herein only to the extent necessary to show the correlation between the structures described in the respective applications.

The photographing machine incorporating the present invention is particularly designed to photograph documents for producing one or more copies equal in size to the original and in which the sizes may vary from 2.4 x 3.6 inches to 6 x 8.5 inches. The photographic copies are positive reading negatives to eliminate the cost of producing a negative. However, in some cases it may be desired to first produce a negative and then in producing a number of copies of the same document to produce them as positives rather than as positive reading negatives. The machine is designed to use varying widths of sensitized paper from 3.6 inches up to 8.5 inches. The machine is also adapted to make photographic reductions of documents of varying sizes, and will make reductions of documents of approximately 8.5 x 11 inches.

The present document photographing machine is particularly designed to rapidly feed standard sizes of cards, sheets and forms across the copy table in which the feed mechanism is operated in timed relation to the photographing mechanism and the sensitized strip feed so that accurate photographic reproduction of the cards or other documents can be rapidly and accurately made at low cost. In addition, the machine provides for producing two or more duplicate copies of documents of several different sizes in a rapid and inexpensive manner without stopping the feed mechanism during the production of the duplicate copies. This is obtained by maintaining a constant feed of documents through the photographing position on the copy table and changing the position of the copy table from front feed position, where it is used for making copies of most all sizes of documents within the range of the camera, to side feed position for producing more than one duplicate copy of a document while maintaining constant feeding of documents. Provision is made to set the machine for feeding and photographing any size of document within the range of the photographing unit.

Figures 4, 8, 9, 10:
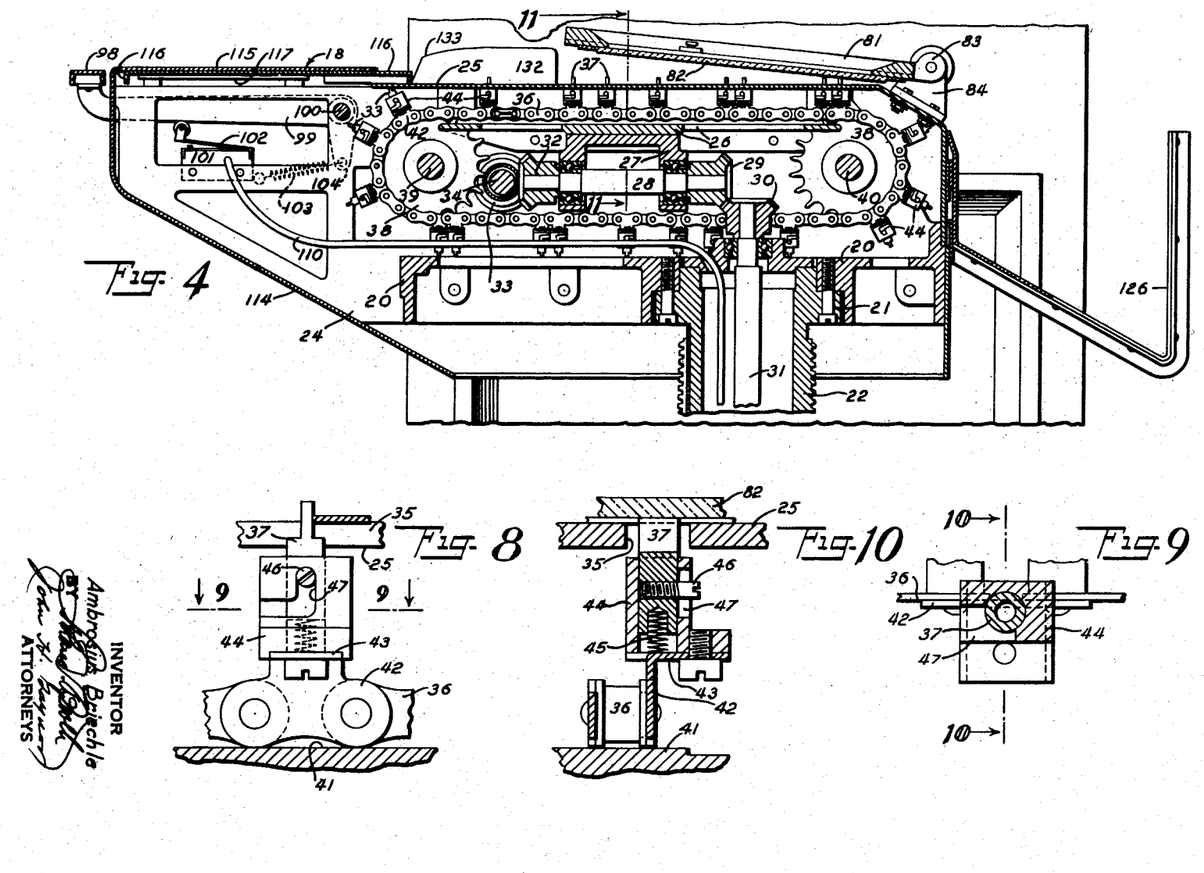
Fig. 4 is a vertical longitudinal cross-section taken on line 4—4 of Fig. 1 and showing details of construction of the copy table.
Fig. 8 is an enlarged fragmentary detail showing the structure of one of the document feed fingers in side elevation.
Fig. 9 is a cross-section taken on line 9—9 of Fig. 8.
Fig. 10 is a cross-section taken on line 10—10 of Fig. 9.
Figure 5:
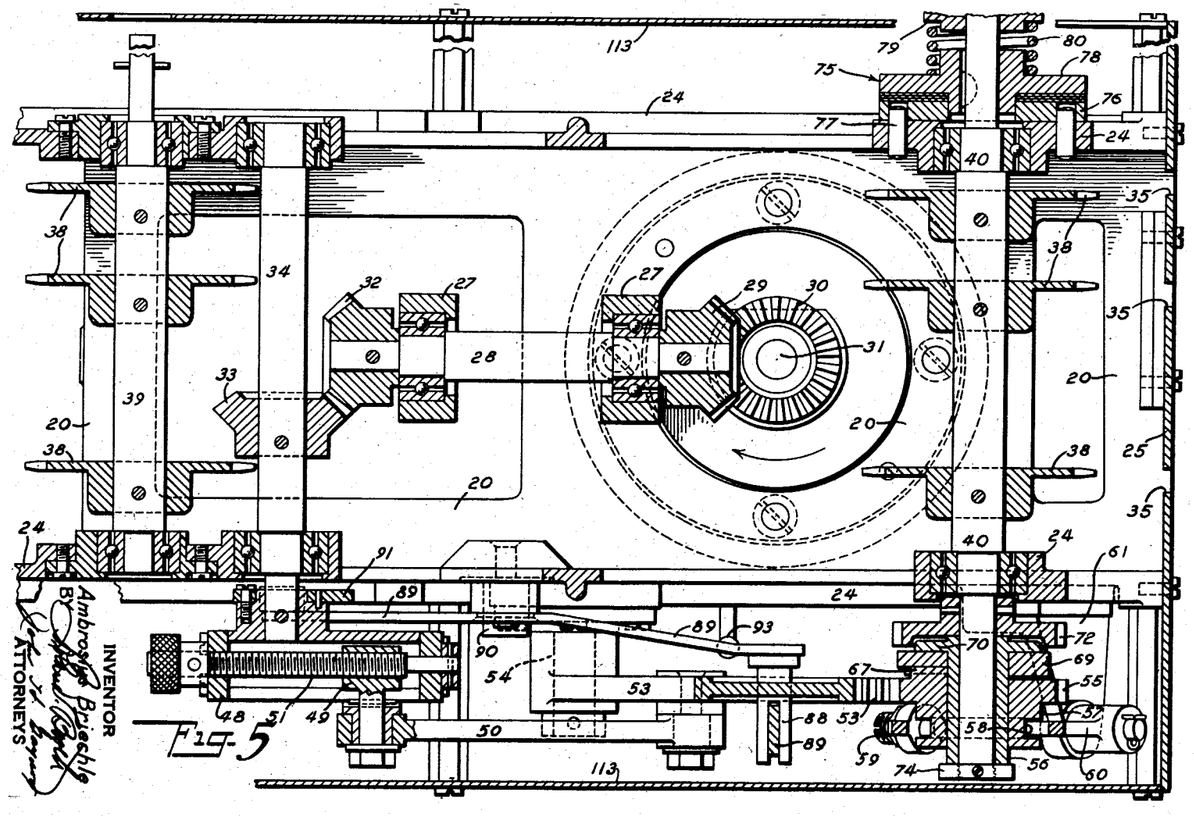
Fig. 5 is a horizontal cross-section taken on the line 5—5 of Fig. 2.
Figure 6:
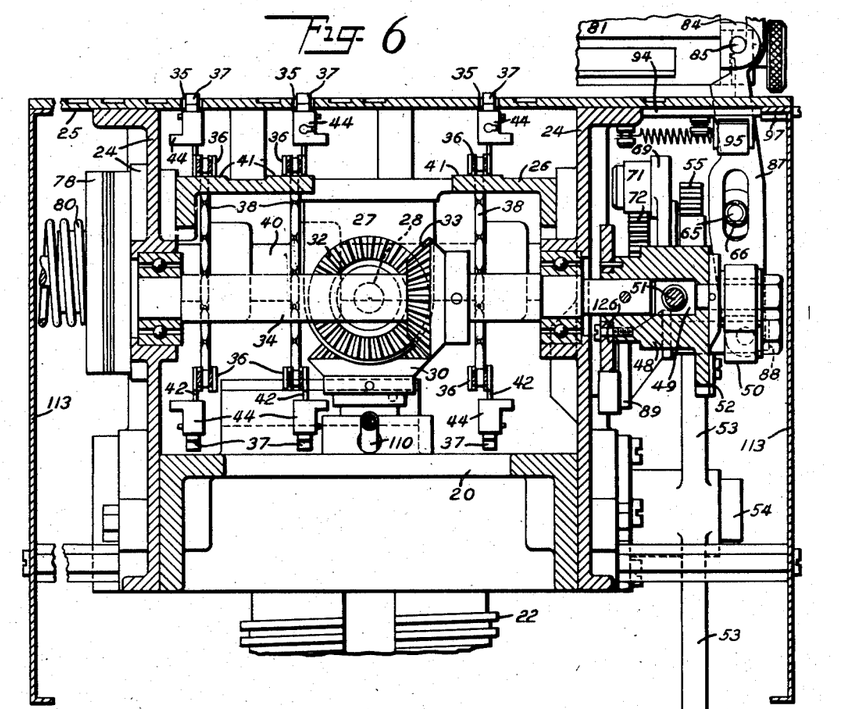
Fig. 6 is a vertical transverse cross-section taken on line 6—6 of Fig. 2.

The copy table 18 illustrated in the drawings includes a frame formed with a supporting plate 20 having an annular seat engaging on an annular flange 21 to which it is rigidly secured by machine screws or the like for rigidly attaching and supporting the copy holder on post 22 carried by and forming a part of a photographing machine, such as the machine described in copending application Serial No. 528,221, and designated generally herein by numeral 19. A pair of side frame members 24 are secured at the lower edges to opposite sides of supporting plate 20 and extend upwardly above said plate to support copy plate 25 in horizontally extending relation on the upper edges thereof. A supplemental frame 26 is mounted in horizontally extending relation below copy plate 25 and extends between the upper portions of side frame members 24 and is rigidly secured thereto, as shown in Figs. 4 and 6. A shaft supporting bracket 27 is mounted on the under side of supplemental frame 26 in the central portion of the copy table and has bearings carried thereby for rotatably mounting shaft section 28. A bevel gear 29 is rigidly mounted on the rear end of shaft section 28 meshing with bevel gear 30 on the upper end of shaft 31, extending axially through said post 22 and from which shaft section 28 is driven. The opposite end of shaft section 28 carries a bevel gear 32 rigidly mounted thereon and meshing with a bevel gear 33, Fig. 5, rigidly mounted on copy table drive shaft 34. Copy table drive shaft 34 is journalled at opposite end portions in ball-bearings mounted in side frame members 24 with the right-hand end of shaft 34 looking from the front end of the copy table extending outwardly beyond the outside of the right-hand side frame member 24 for carrying a crank arm for driving the copy feed mechanism in a manner that will be hereinafter described.

Figure 11:
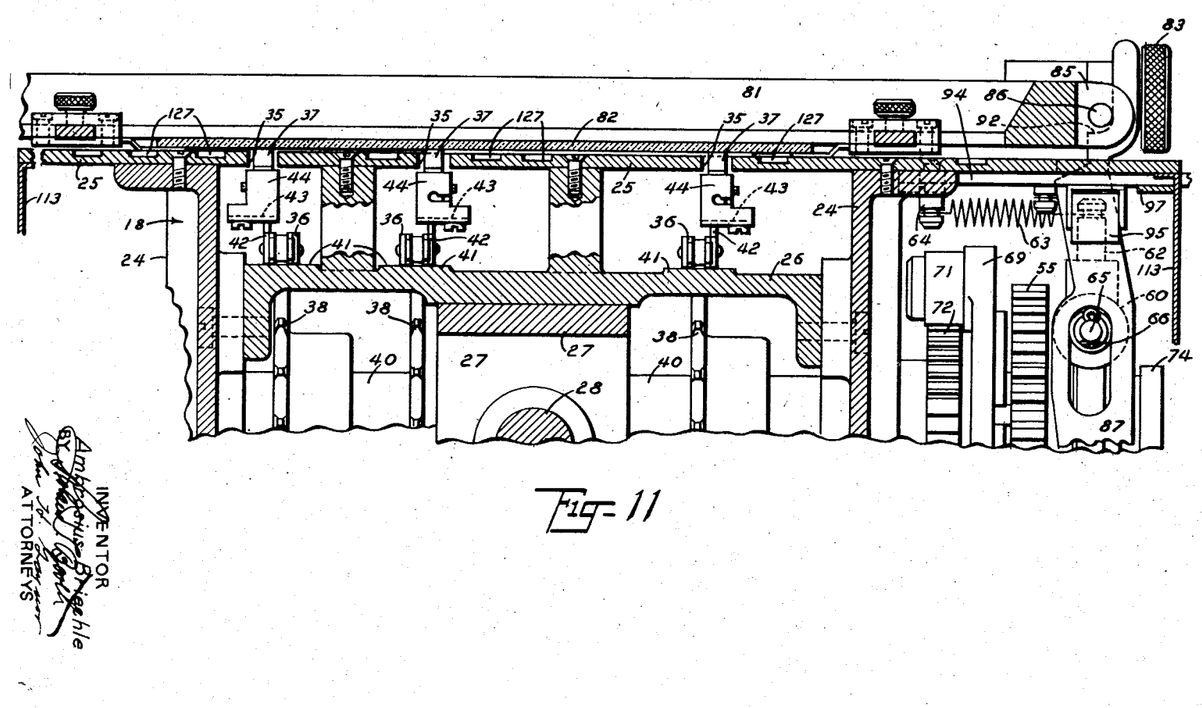
Fig. 11 is a vertical transverse cross-section taken through the copy table on line 11—11 of Fig. 4.

Copy plate 25 is formed to receive and have documents to be photographed fed thereover from the front end to the rear end thereof and when in the central rear portion of the copy plate the document will be moved through a photographing position that will be arranged in focus with the photographing means so that documents on said copy plate can be focused on the sensitized strip in the focal plane of the document photographing machine. Copy table 25 is formed as shown in the drawings with three longitudinally extending slots 35 two of which are arranged in substantially equidistant relation at each side of the longitudinal center of copy plate 25 while the third is formed on the left-hand side of the copy plate in spaced parallel relation to the other two slots as clearly shown in Figs. 1, 6 and 11. Endless link belts or chains 36, three in number corresponding to longitudinally extending slots 35 each carry a plurality of retractable feed fingers 37 for document engaging and feeding purposes. These endless link or belt members are each mounted on two sprockets 38, there being three sets of two sprockets each with corresponding sprockets of each set rigidly mounted on spaced parallel sprocket shafts 39 and 40, respectively. Sprocket shaft 39 is mounted at the forward end of the copy table frame and has opposite ends rotatably mounted in ball bearings carried by side frame members 24 as shown in Fig. 5. Sprocket shaft 40 extends transversely of the copy table at the rear end thereof and has opposite ends mounted in ball bearings in side frames 24, as shown in Fig. 5. Sprocket shaft 40 has end portions extending beyond the outer side of side frame members 24 for a purpose to be presently described.

Supplemental frame 26 is provided with a plurality of longitudinally extending guides 41 on the upper face thereof for receiving and guiding the upper flights of endless link belts to guide and hold retractable feed fingers 37 in position to extend through slots 35 for engaging and feeding documents across the top face of copy plate 25. These guides 41 are so positioned in guiding the top flights of endless link belts 36 that only a sufficient amount of the upper free ends of the retractable feed fingers in their extended position project through the slots to fully and firmly engage the edge of a paper sheet or document to obtain positive feeding thereof.

The link belts 36 are illustrated in the drawings in the form of endless chains of conventional construction. Certain of the links of these chains are of special construction to carry retractable feed fingers 37. Either the central link of the chain or one of the pair of side plate links connecting two center links may be constructed to carry feed fingers 37. The details of construction of a side plate link for carrying the feed fingers are illustrated in Figs. 8 to 10 showing a special side plate for connecting two center links at 42 formed with a projecting portion on one edge thereof terminating in a laterally extending projection 43. If a center link were used instead of a side plate link it would be formed with a similar projection to projection 43.

Each retractable feed finger comprises a holder 44 having a foot portion secured to lateral projection 43 by a set screw and a cylindrical passage for slidably mounting feed fingers 37. Finger holder 44 houses a coil spring 45 for compression against the inner end of feed finger 37 for normally projecting it outwardly from the free end of the holder. A retaining screw 46 is mounted in feed finger 37 through an angle slot 47 in holder 44. One portion of the angle slot extends axially of the cylindrical portion of holder 44 and the other part extends circumferentially therefrom at the inner end for holding feed finger 37 in retracted position when it is pushed inwardly against the tension of spring 45 until retaining screw 46 can be moved into the circumferentially extending portion of slot 47. This will hold feed finger 37 in a retracted position where it will not project through the slot 35 and therefore will not feed documents. The free end of each feed finger 37 is formed to provide a flat transversely extending face on the front and rear sides thereof as shown in Figs. 8 and 10, to provide document engaging faces for engaging the edges of documents in the feeding operation, as shown in Fig. 8. The free end of each feed finger is therefore of narrow dimension in the direction of feed so two documents can be arranged with edges close together for photographing.

It will be noted in Fig. 4 that document feed fingers 37 are not mounted in uniformly spaced relation on the endless chain but are unequally spaced. This unequal spacing provides for the feeding of documents of various sizes through the photographing position on the copy plate by the particular selection of feed fingers desired for the size of the document while the remaining feed fingers are retracted into inoperative position.

Supplemental frame 26 between longitudinally extending guides 41 is formed with a plurality of upwardly extending projections having copy plate 25 secured to the upper ends to provide a reinforced construction in which copy plate 25 is rigidly supported in flat relation against flexing.

The drive connections between copy table drive shaft 34 and sprocket shaft 40 are shown in Figs. 2, 5, 6 and 11 to 15.

Crank arm 48 is mounted in radially extending relation on the right-hand end of copy table drive shaft 34 for rotation therewith. Crank arm 48 is provided with a pair of radially extending guideways slidably mounting a slide block 49 carrying a projection rotatably mounting one end of pitman 50. A manually rotatable screw 51 is mounted in radial relation in crank arm 48, as clearly shown in Fig. 5, and is threadedly engaged in slide block 49 for holding it in any position of adjustment in the guideways of crank arm 48. An indicator strip 52, Fig. 2, is mounted on crank arm 48 adjacent one of the guides for slide block 49 for cooperation with an indicator mark on the slide block to indicate the different positions in which the slide block may be set for a plurality of different predetermined feeding positions of the slide block on the crank arm for documents of the sizes indicated.

Figure 2:
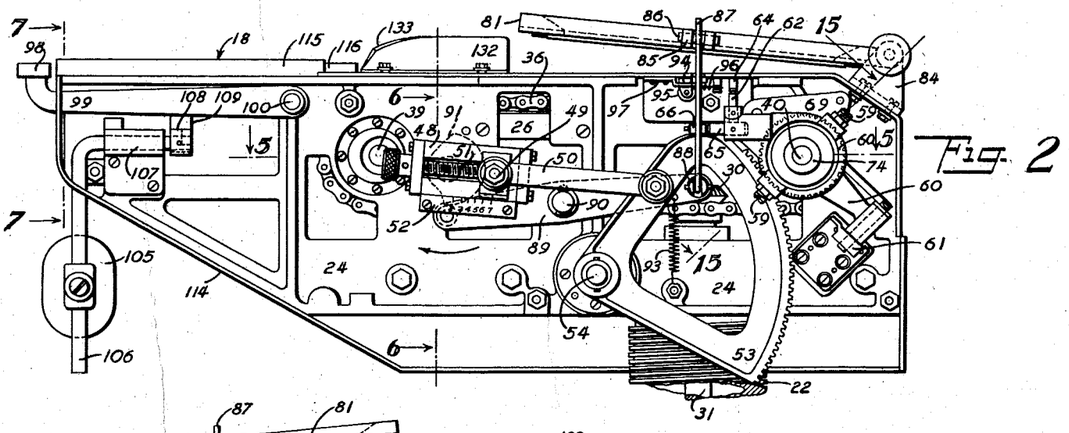
Fig. 2 shows the copy table in side elevation looking from the right side and with the side cover plate removed to illustrate the details of construction.

The other end of pitman 50 is pivotally connected to a gear segment 53, Fig. 2, rotatably mounted on shaft extension 54 projecting outwardly from the right-hand side frame member 24 in the lower central portion thereof.

Figures 12, 13, 14, 15:
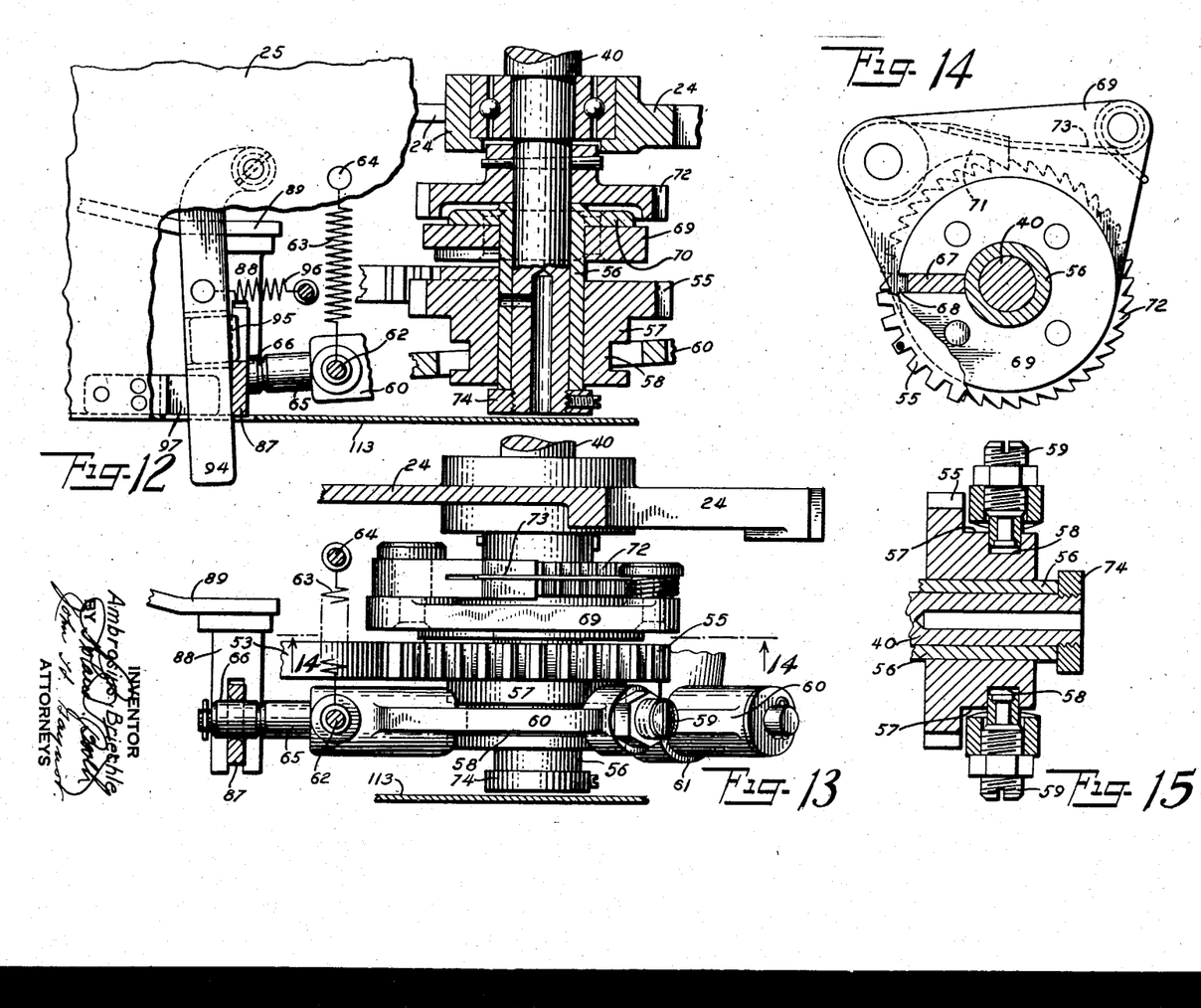
Fig. 12 is an enlarged fragmentary plan view of a portion of the copy table with parts broken away to illustrate the manual control for connecting and disconnecting the document feed means with the driving means, the clutch and drive mechanism being shown in horizontal cross-section.
Fig. 13 is a top plan view of the document feed control means shown in Fig. 12.
Fig. 14 is a cross-section taken on line 14—14 of Fig. 13.
Fig. 15 is an enlarged detail cross-section through the ratchet gear and clutch member showing its mounting on the end of one of the shafts of the document feed mechanism and illustrating the details of construction of the connection between this ratchet gear and the operating arm for sliding it on the shaft to engage and disengage the clutch, taken on the line 15—15 of Fig. 2.

Gear segment 53 has the gear teeth thereon meshing with the teeth of a gear 55 rotatably mounted on a sleeve 56 which is rotatably mounted on the outer end of sprocket shaft 40, Figs. 5, 12 and 13. Gear 55 has an annular collar 57 formed integral therewith on one side and formed with an annular groove 58 having the rollers on the inner ends of control pins 59 engaged in the groove. Control pins 59 are adjustably mounted, as shown in Fig. 15, in the central yoke portion of clutch operating arm 60. Arm 60 has one end pivotally mounted on an upwardly extending pin formed on pivot bracket 61, as clearly shown in Fig. 2. The other and free end of clutch operating arm 60 extends in angular relation to the portion extending between the pivot bracket and control pins 59 and carries an upwardly projecting stud 62 having one end of a tension spring 63 engaged thereon with the opposite end secured to a stud 64 depending from the under side of copy plate 25. Spring 63 normally tends to move clutch operating arm 60 toward the right-hand side frame member 24. Another stud 65 projects from the free end of clutch operating arm 60 at right angles to stud 62 as shown in Fig. 2 and rotatably mounts a roller 66 on the free end thereof.

Gear 55 has a clutch tooth 67 on the inner face projecting inwardly for engagement in a slot 68 formed in the adjacent face of pawl carrying plate 69, Fig. 14. This plate 69 is riveted to an annular flange 70 formed on the inner end of sleeve 56, Fig. 12. One outer corner of pawl carrying plate 69 pivotally mounts a pawl 71 on the inner face thereof in position for the free end to engage with ratchet teeth on ratchet wheel 72. Ratchet wheel 72 is pinned on sprocket shaft 40 adjacent the bearing mounting of said shaft in right-hand side frame member 24, as clearly shown in Fig. 12. The outer face of ratchet wheel 72 is recessed to receive annular flange 70 on sleeve 56 in order that pawl carrying plate 69 can be mounted in close adjacent relation to ratchet wheel 72. A spring 73 is mounted on the other corner of pawl carrying plate 69 in the manner shown in Fig. 14 and has opposite ends arranged to engage pawl carrying plate 69 and pawl 71 for normally moving the free end of pawl 71 into engagement with the teeth on the periphery of ratchet wheel 72 so that in the oscillation of pawl carrying plate 69 back and forth, pawl 71 will engage the teeth on ratchet wheel 72 and rotate the ratchet wheel intermittently in one direction.

A collar 74 is mounted on the end of sprocket shaft 40 for normally retaining sleeve 56 against endwise movement on the outer end of shaft 40, the inner end thereof being engaged with the outer face of ratchet wheel 72.

Gear 55 is slidable axially on sleeve 56 in the operation of clutch operating arm 60 in order that clutch tooth 67 can be engaged and disengaged with slot 68 in pawl carrying plate 69. When clutch operating arm 60 is moved inwardly toward side frame member 24 clutch tooth 67 will be engaged in the slot in pawl carrying plate 69. In this engaged relation rotation of copy table drive shaft 34 will rotate crank arm 48 and convert the rotary motion of said shaft into reciprocating motion through pitman 50 which will oscillate gear segment 53 on its shaft extension 54. This oscillation of gear segment 53 will in turn oscillate gear 55 and pawl carrying plate 69. This oscillation of pawl carrying plate 69 will intermittently drive ratchet wheel 72 in a clockwise direction as illustrated in Figs. 2 and 14 to thereby intermittently rotate sprocket shaft 40 in a clockwise direction as shown in Figs. 2 and 14 and lineally move link belts or chains 36 intermittently in one direction for feeding documents through the photographing position on the copy table from the left to the right as shown in Fig. 2.

When clutch operating arm 69 is moved to disengage clutch tooth 67 from slot 68, continued rotation of copy holder drive shaft 34 will merely oscillate gear segment 53 and gear 55 on sleeve 56 while sprocket shaft 40 and pawl carrying plate 69 remain stationary.

In order to hold sprocket shaft 40 stationary in the disengaged position of clutch tooth 67, the left-hand end of sprocket shaft 40 on the opposite side of the copy table is provided with a friction clutch 75. Friction clutch 75 has a stationary clutch plate 76 engaged against the portion of side frame member 24 surrounding the bearing for sprocket shaft 40 and held against rotation by pins 77, Fig. 5. A plurality of annular friction discs are engaged on rotatable clutch plate 78 keyed on the end of sprocket shaft 40 for longitudinal sliding movement on the shaft. A collar 79 is retained on the end of sprocket shaft 40 by a set screw for holding a coil spring 80 under pressure between collar 79 and rotatable clutch plate 78 to maintain the desired amount of friction between clutch plates 76 and 78 and on the clutch discs engaged between them so that sprocket shaft 40 is held stationary against rotation at the end of each positive feeding operation by pawl 71 as described above. By this means accurate feeding of documents by retractable feed fingers 37 can be obtained.

Figure 1:
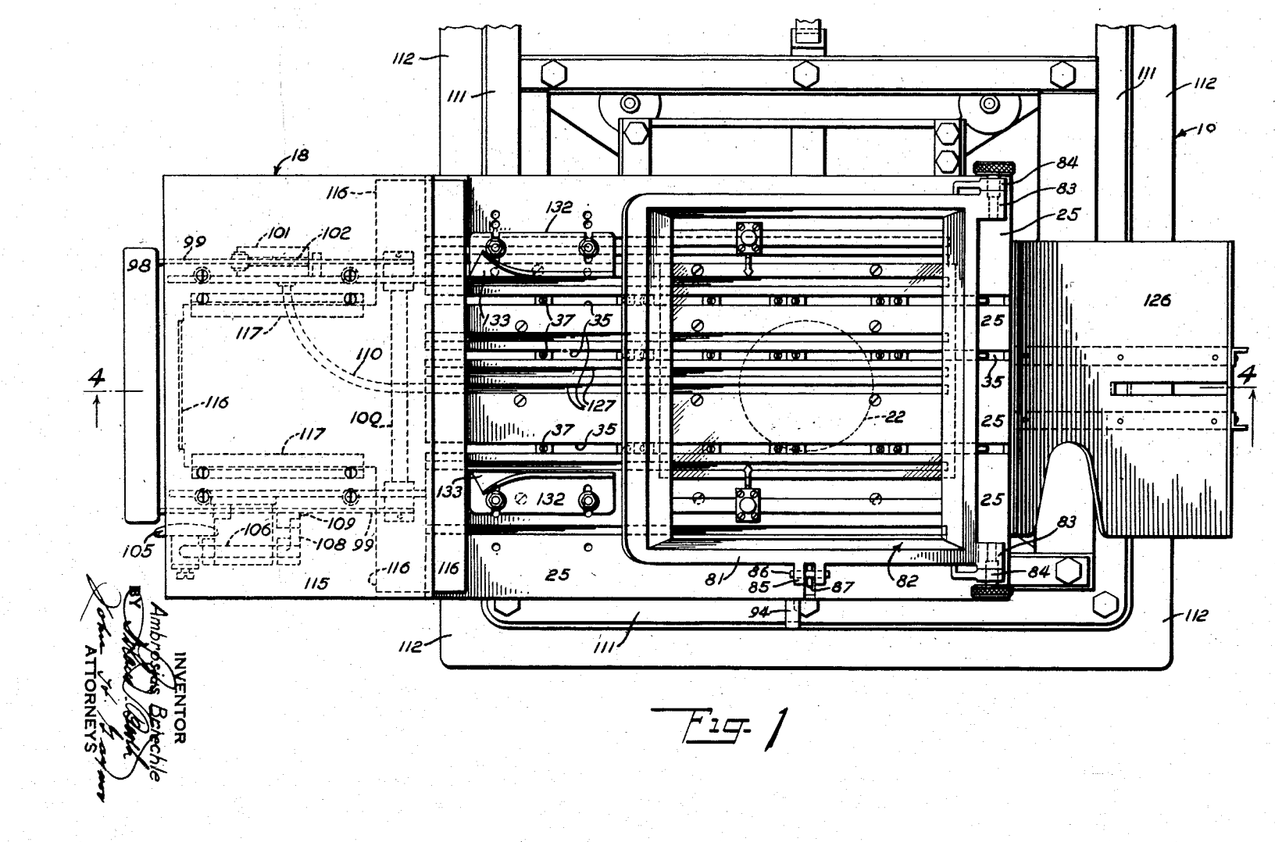
Fig. 1 is a fragmentary plan view showing the copy table and the end portion of the base of a photographing machine on which it is mounted, the copy table being in the side feed position.

A cover plate frame 81 carrying a transparent cover plate 82 has the rear corners at each side provided with a rearwardly extending pivot projection 83 pivotally mounted on pivot brackets 84 secured to the rear inclined portion of copy plate 25, as clearly shown in Figs. 1 and 4. The right-hand side portion of cover plate frame 81 has a bifurcated projection 85 extending laterally therefrom, as clearly shown in Fig. 1, carrying a transversely extending pin 86.

A manually operable lever 87 is formed to provide a handle at the upper end projecting above cover plate frame 81 and extends in substantially vertical relation downwardly at the right-hand side of the copy table through a slot in copy plate 25 with the lower end pivotally mounted on a laterally projecting stud 88 carried by the free end of rock lever 89. The central portion of rock lever 89 is pivotally mounted on shaft projection 90 provided on the central portion of right-hand side frame member 24. The other end of rock lever 89 carries a roller that rides on the periphery of cam 91 secured to the inner end of the hub portion of crank arm 48 for rotation therewith in the rotation of copy table drive shaft 34.

A shoulder 92 is formed on the inner edge of manually operable lever 87 at the upper end portion for engaging transversely extending pin 86 in the bifurcated projection 85. A coil spring 93 has one end secured to the end portion of rock lever 89 adjacent stud 88 and extends downwardly therefrom and is secured at the lower end to the lower portion of right-hand side frame 24, as shown in Fig. 2. This spring is under tension for normally operating rock lever 89 to hold the roller on the opposite end thereof in engagement with the periphery of cam 91. In the rotation of copy table drive shaft 34 cam 91 will operate rock lever 89 to move manually operable lever 87 up and down in timed relation with the intermittent rotation of sprocket shaft 40 for raising cover plate frame 81 and cover plate 82 upwardly in spaced relation above copy plate 25 during the time that sprocket shaft 40 is rotated for moving the feed fingers and feeding a document on the copy plate.

There are times when it may be desired to produce a plurality of copies of the same document. It is, therefore, desirable to control the operation of the document feed independent of the operation of the remainder of the machine so that a document will remain stationary on copy plate 25 under cover plate 82 so that a plurality of duplicate copies thereof can be produced.

Cover plate 82 defines the photographing position on copy plate 25. When it is desired to produce duplicate copies of a document, manually operable lever 87 is moved toward the outside or right-hand side of the copy table for disengaging shoulder 92 from transversely extending pin 86. Then, in the operation of copy table drive shaft 34 manually operable lever 87 will merely be oscillated up and down without engaging pin 86 and without raising cover plate frame 81. Lever 87 has the central portion thereof formed with a vertical slot that receives roller 66 on stud 65 of clutch operating arm 60. When manually operable lever 87 is moved to disengage shoulder 92 from pin 86, clutch operating arm 60 is also moved to disengage clutch tooth 67 from slot 68 and disconnect the drive means from sprocket shaft 40. This will provide for the operation of the machine without feeding a document into or out of the photographing position so that as many copies as desired may be made of a document in photographing position.

A holding lever 94 is pivotally mounted on the under face of copy plate 25, as shown in Fig. 12, in horizontal relation with the free end projecting outwardly through a slot in the right-hand side plate of the copy table. Holding lever 94 carries a roller 95 in a position so that the edge of the roller will engage the inner edge of manually operable lever 87 and hold it and arm 60 in the document feed disengaging position thereof, as shown in Fig. 12, and retain this lever 87 in this position during its up and down movement in the production of duplicate copies of a document in photographing position. A coil spring 96 has one end secured to lever 94 and the opposite end secured to a stud projecting downwardly from the under side of copy plate 25. Spring 96 is normally under tension for moving holding lever 94 into position to hold manually operable lever 87 in the disengaged position of the copy feed. A guide bracket 97 mounted on the under side of copy plate 25 holds the free end of holding lever 94 against flexing. By pulling the free end of holding lever 94 forwardly, or to the left as shown in Fig. 12, roller 95 will be disengaged from lever 87. Spring 63 will then operate clutch operating arm 60 and through the medium of roller 66 move lever 87 into its operating position for engaging shoulder 92 with pin 86 while the document feed will be engaged by operation of collar 57 to engage tooth 67 in slot 68 for operation from copy table drive shaft 34.

Figure 3:
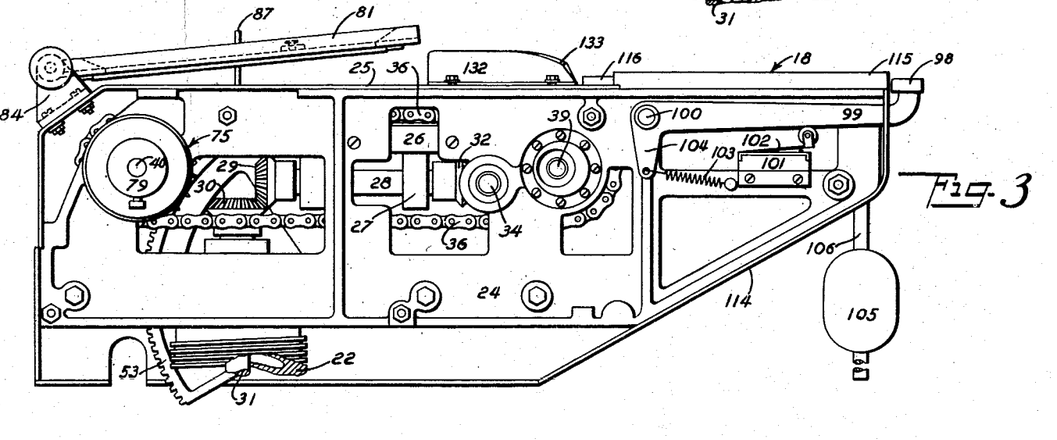
Fig. 3 shows the copy table in side elevation looking from the left side with the side cover plate removed.

A main control bar 98 is mounted in advance of the front end of said copy table on the free ends of a pair of spaced parallel levers 99 extending rearwardly under the top portion of the copy table and mounted at the rear end on the ends of a shaft 100 rotatable in bearings in side frame members 24, as clearly shown in Fig. 1. A micro-switch 101 is mounted on the forward end of the left-hand side frame 24, as shown in Figs. 1, 3, 4 and 7, and has a spring arm 102 secured thereto at one end and provided with a roller at the opposite end engaging the under side of the lever 99 on the left-hand side of the copy table. This structure is arranged so that depression of main control bar 98 will move the roller and spring arm 102 downwardly as shown in Fig. 3, for example, and operate the micro-switch to close an electric circuit to a solenoid (not shown) to release the drive means for one cycle of operation.

Main control bar 98 is held in upper position through the medium of a coil spring 103 having one end secured to laterally extending arm 104 depending from the left-hand lever 99, as shown in Fig. 3. The other end of coil spring 103 is suitably secured to left-hand side frame member 24 to maintain the spring under a suitable tension for holding main control bar 98 in the upper position in which micro-switch 101 will normally remain in a position to open the circuit to the solenoid and hold it open.

It is also found desirable to provide means for operating micro-switch 101 by means of the knee instead of operating control bar 98 by the hand. For this purpose a knee pad 105 is mounted on an angle lever 106 having one end in horizontally extending relation and rotatably mounted in bearing 107 on the right-hand side frame member 24, Fig. 2. The portion of angle lever 106 carrying knee pad 105 depends downwardly at the front end of the copy table as clearly shown in Fig. 2. The horizontal portion of angle lever 106 in bearing 107 has a finger 108 rigidly mounted on the free end engaging the top of the laterally extending end of a projection 109 provided on the right-hand lever 99.

By operating knee pad 105 to move angle lever 106 in a counter-clockwise direction, or to the left as shown in Fig. 1, finger 108 will be moved downwardly and engage projection 109 to move spaced parallel levers 99 downwardly for operating micro-switch 101 to close the circuit to the solenoid.

A cable 110 carrying the wires from microswitch 101 extends through the central portion of the copy table frame and downwardly through the central portion of post 22, as shown in Fig. 4, and then through casing 111 and base 112 of the photographing machine 19 to the drive unit and solenoid. For convenience in illustrating the invention this cable is omitted from some of the figures in the drawings.

The copy table has the rear end of copy plate 25 extending to the rear of the photographing position and inclined downwardly and rearwardly as shown at the right-hand side of Fig. 4. The copy plate is then provided with a depending vertically extending portion secured to the rear edges of side frame members 24, as shown. Side cover plates 113 are secured to the under side edges of copy plate 25 at the upper edges and at the lower portions are secured in spaced parallel relation to side frame members 24 to fully enclose the feed mechanism mounted in the copy table. The front end of the copy table is provided with a front cover plate 114 detachably secured about the front end of the frame member 24 as shown in Fig. 4, to provide a document table over the top of the frame at the front portion thereof as indicated at 115 and then extend down over the front ends of frame members 24. The lower front portions of side frame members 24 are formed to provide inclined front edges extending forwardly and upwardly from the bottom edges of the copy table frame as shown in Fig. 4, with the front cover plate provided with an inclined portion secured to these inclined front edges. The side edges of cover plate 114 extend to and are engaged with the front edges of side cover plates 113 also having the front edge portions inclined correspondingly to side frame members 24.

Figure 7:
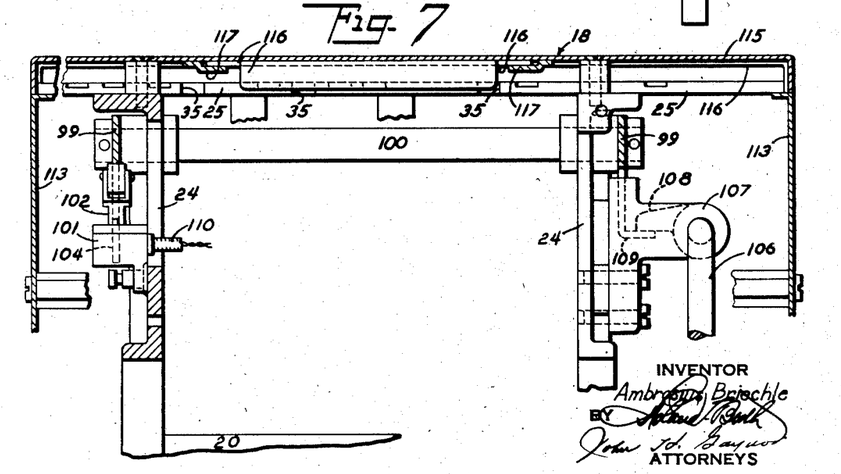
Fig. 7 is an enlarged detail cross-section taken on line 7—7 of Fig. 2.

It will be noted that document table 115 is positioned above the horizontal plane of copy plate 25 at the front end of the copy table. A supplemental table section 116, Figs. 1, 4 and 7, is slidably mounted in guides 117 on the under side of document table 115 and has the rear end projecting from under document table 115 over the top face of copy plate 25. The rear portion of supplemental table section 116 extends entirely across the copy table as shown in Fig. 1. This supplemental table section is slidably longitudinally for adjustment over copy plate 25 to provide a longer or shorter document table as desired depending on the size of documents being photographed in the machine.

Operation

This copy table is designed for employment with a photographing machine arranged to make one or more photographic copies at unity of documents such as index cards and the like, particularly those included in several standard sizes as follows:

| | |
|---|---|
| 2.4 x 3.6 | 5 x 7 |
| 3 x 5 | 6 x 8 |
| 4 x 6 | 6 x 8.5 |

The sizes expressed above are in inches.

The machine as disclosed in copending application Serial No. 528,221 is designed to use different widths of sensitized paper strips or film, particularly widths of 3.6, 5, 6, 7, 7.6, 8 and 8.5 inches, respectively.

A limited number of duplicate copies of the first three sizes of cards listed above may be made by continuous intermittent feeding of documents in operation of retractable feed fingers 37. This gains a substantial advantage in producing a limited number of duplicate copies of documents because the documents may be continuously fed through the machine while the desired number of duplicates are produced.

The arrangement and operation of the photographing machine 19 is fully set forth in the said copending application 528,221, particularly the placing of the sensitive strip 128 in the photographing machine housing and its adjustment. This machine is particularly designed for taking a large number of pictures of documents of one size at the same time on a sensitized strip carried on a supply spool 128 mounted in said photographing machine 19 and fed through the focal plane of the camera in spaced apart vertical guide strips 129 to a receiving spool 130 by means of a feed roll 131, forming a part of the feed mechanism of machine 19. The above arrangement is clearly shown in Fig. 16.

At the time the sensitized strip is placed and arranged for photographing a group of cards, the copy table is also set in position and adjusted for properly feeding the cards through the photographing position. The cooperating feed mechanism of the camera and copy table for the sensitized strip and groups of cards, respectively, are adjusted, as fully described in the said copending application, to feed the sensitized strip a sufficient amount to move an exposed portion thereof out of the photographic plane behind the masking plate 124 of the camera, Fig. 16, and to move the retractable feed fingers to feed a document a sufficient amount so that it will be accurately moved into proper focus for photographing and then moved out of this position and be replaced by another document in the same position. Side cover plates 113 are usually removed from the copy table in making these adjustments to set up the machine for photographing a group of documents of one size.

The copy table is positioned either in front feed or side feed position according to the type of documents being photographed and the number of copies desired.

Figure 16:
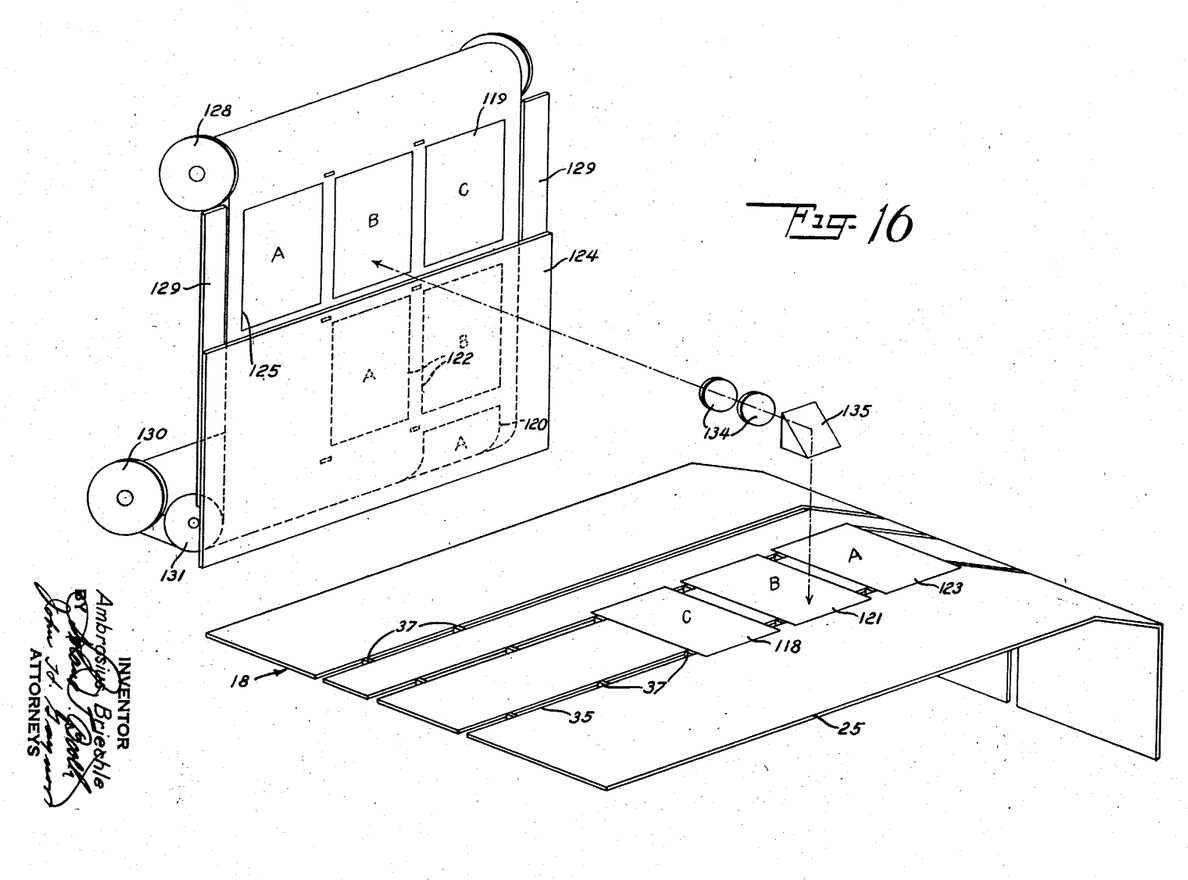
Fig. 16 illustrates diagrammatically one application of the invention for producing three copies of a document with the copy table in side feed position.

Fig. 16 illustrates diagrammatically one application of the invention for photographing documents to produce three copies of a document with the copy table 18 in side feed position. The illustration in Fig. 16 shows how cards of the small size listed above, that is 2.4 x 3.6 inches, may be fed over copy plate 25 in side feed position and three photographic copies produced on a sensitized strip 7.6 inches wide. This application of the machine is used for state automotive registration purposes in several different states.

It is customary for an applicant for state auto registration to make out a printed application form. A particular area of this form having the 2.4 x 3.6 size is filled out by the applicant with all of the information that he is required to carry on his copy of the certificate of registration. A negative of this portion of the form is produced and these negatives are then used to produce positive copies on the present machine as disclosed in this application in the manner disclosed in Fig. 16.

The copy table 18 is arranged in side feed position and the feed mechanism for document feed fingers 37 is adjusted so that selected feed fingers 37 positioned at the distance of 2.5 inches apart on the endless members are in projected feeding position and the remainder of the fingers are moved into retracted position. Crank arm 48 of the feed table has the rotatable screw 51 adjusted to position slide block 49 for rotating sprocket shaft 40 an amount sufficient to move link belts 36 a distance of 2.5 inches in each lineal movement thereof in feeding the cards through the photographing position. The negatives of the cards will be fed with the 3.6 inch dimension extending transversely of copy plate 25, as shown in Fig. 16.

The sensitized strip masking plate and feed mechanism will be set up so that the strip will be fed 3.85 inches in each cycle of operation of the machine in taking each photograph and punching the strip adjacent thereto. The photographing arrangement as disclosed in Fig. 16 will be such that when one of the negative cards is moved into the photographing position indicated by the numeral 118 in Fig. 16, it will be at the left-hand side of the photographing position toward the front of the copy table and will produce an image in the focal plane on the sensitized strip at the upper right-hand corner of the focal plane, as indicated by the numeral 119. These negative documents are continuously fed from the front end of the copy table in side feed position, so that in each operation of the machine through one complete cycle by depressing control bar 98 a document will be fed forward one step and photographed. Each successive document being moved into this position 118 will produce a photograph on the sensitized strip at position 119 and these photographic images will be in successive order in longitudinally aligned relation on one side of the sensitized strip.

The arrangement shown will produce three copies of each document. The first copy is produced in the position 119. During the production of subsequent copies the image of the first document will be moved successively downward with repeated feeding of the sensitized strip in the manner hereinabove described until the first image of the first document reaches a position indicated in Fig. 16 at 120 at the time the third copy of a copy is made.

The first operation of control bar 98 will first feed a document into position 118, simultaneously feed the sensitized strip into the focal plane, and then punch and photograph the document in position 118 on the sensitized strip in position 119. This will complete one cycle of operation obtained by operating control bar 98.

The depression of control bar 98 again will set the machine in motion to complete another cycle of operation of the machine. During this next cycle of operation the card in position 118 will first be moved into position 121 with simultaneous feeding of a new card to position 118 and feeding of the sensitized strip to move the first card image downwardly behind masking plate 124. The cycle of operation is completed by the punching of the strip and photographing the two cards in positions 118 and 121 on the sensitized strip.

Depression of control bar 98 a third time will secure another operation to feed the first card to position 123, the second card to position 121, and a new card to position 118, all in photographing position. Another portion of film is fed into the focal plane above mask 124 and when this is completed the punching and photographing means will be operated to complete the cycle when the situation disclosed in Fig. 16 will exist.

The first card photographed designated A, Fig. 16, will have the first image thereof located at position 120, the second image in the central portion of the sensitized strip is located under masking plate 124 at the position 122. The third image of card A in position 123 will be produced on the sensitized strip at position 125. The second card indicated by the letter B will have the photographic copies thereof in corresponding positions on the sensitized strip following those of card A. Card C will then be photographed in successive operations to produce three copies following the copies of card B.

In the third cycle of operation it will be noted that cards A, B and C are photographed simultaneously and in subsequent operations three cards will be photographed in a similar manner as long as new cards are fed. The card A and following cards will be discharged from position 123, Fig. 16, over the rear downwardly inclined surface of copy plate 25 into card receptacle 126 mounted on the rear end of the copy table, Fig. 9.

In the many operations for producing pictures of documents, it will be understood that the mechanism on the copy table as hereinabove described will be operated to lower cover plate 82 and cover plate frame 81 into a position where cover plate 82 will engage the upper face of documents on the feed table in the photographing position and hold them firmly in a flat position on the table so that they will be clearly photographed on the sensitized strip. During each feeding operation of the cards over the copy table in the photographing position the mechanism operates to lift cover plate frame 81 with the cover plate in the manner as shown in Figs. 2 and 3 so that it will not interfere with the feeding of the documents and in order to avoid scratching of the under face of the cover plate. However, in photographing some types of documents, cover plate frame 81 will be removed and a guide frame placed on copy plate 25 with portions engaged in grooves 127 for holding it in position.

It will be understood that in the operation of control bar 98 to energize the solenoid, the drive means of the photographing machine will operate to produce one complete cycle of operation in the manner described in the aforesaid copending application. This will produce one complete revolution of the main drive shaft for the sensitized strip feed mechanism when adjusted to obtain the length of feed desired for a particular photographing operation such as the one disclosed in Fig. 16 and described above.

The copy table mechanism will be operated so that copy table drive shaft 34 will also be rotated through one revolution. This will first operate cam 91 to hold cover plate frame 81 in an elevated position while segmental gear 53 is moved from the position shown in Fig. 2 in a counter-clockwise direction in the clockwise rotation of crank arm 48 one-half revolution as shown in Fig. 2. Pawl carrying plate 69 will be rotated in a clockwise direction for rotating feed shaft 40 for feeding documents over copy plate 25. Segmental gear 53 will be moved an amount equal to twice the radial distance of slide block 49 from shaft 34. In the completion of the revolution of the copy table drive shaft, gear segment 53 will be moved in a clockwise direction back to the position shown in Fig. 2. This movement will cause pawl carrying plate 69 to move in a counter-clockwise direction as shown in Fig. 2, pawl 71 will idle over ratchet wheel 72, documents will not be fed, and cover plate frame 81 will be in a lowered position to hold the documents while they are being photographed.

In setting up the copy table for document feed purposes, for example to feed cards of the size as herein described above in connection with Fig. 16, guide frames are used with frame 81 removed for guiding the documents at the edges so that they will be positioned transversely of the copy plate and guided in a straight path during the feeding movement through the photographing position. For this purpose copy plate 25 may be provided with a series of longitudinally extending shallow grooves 127 intermediate of and on opposite sides of slots 35 as clearly shown in Fig. 1. Guide strips, not shown, are formed on the bottom of the guide frames and fit into selected grooves for holding the frame in position on copy plate 25 for guiding the cards. It will be understood that a series of guide frames may be used instead of frame 81, each for a different size of document. Masking plates may also be used on the copy table in making photographic copies of documents. The several grooves are formed in copy plate 25 to align and position the masking plates and guide frames in desired positions.

A pair of angle guide members 132 have upwardly extending guide flanges formed thereon with the forward edges curved outwardly as indicated at 133, Fig. 1. The horizontal portions of angle guide members 132 are transversely slotted to receive suitable set screws for retaining them in adjusted position on copy plate 25 in advance of cover plate frame 81. Angle guide members 132 are employed to also guide documents of the desired width into the photographing position in a transverse position on copy plate 25 that will bring the document in the desired portion of the photographing position, such as illustrated in connection with the disclosure in Fig. 16, where the documents are fed through the photographing position at the left-hand side of the optical center of the photographing means compared with the position of copy table 25 in order to bring the major portion of the image photographed on the sensitized strip above the optical center in the focal plane on the strip feed supporting member.

It will be understood that 3 x 5 and 4 x 6 inch cards may be photographed with the copy table in the side feed position in a manner similar to that disclosed in Fig. 16 so that two photographic copies of documents may be produced in a similar manner to the production of three copies as described and shown in Fig. 16. This side feed position of the copy table, therefore, facilitates the production of a large number of copies of documents where two or three copies of each document are desired and at the same time rapid photographing of documents can be obtained because of the continuous feeding operation of documents on the copy table and through the photographing plane with a new document being fed for each cycle of operation of feeding and photographing through depressing bar 98.

Where larger documents than those just mentioned are to be photographed and in cases where only single photographic copies are desired, it is preferable to feed the copies over the copy plate with the copy table arranged in the front feed position. In photographing documents with the copy table in the front feed position it will be understood that a sensitized strip having the same width as the document being photographed will be used and mounted in the strip feed mechanism. By width of the document is meant the dimension of the document that is arranged to extend transversely from side to side of the copy table. When the machine is set up for photographing documents in the front feed position at unity, using a strip having the same width as the transverse dimension of the card across the copy table, then the position of the document on the copy table is arranged so that the rear edge of the document on the copy table will have its image at the top edge of the focal plane on the sensitized strip supporting member adjacent the position where the sensitized strip is punched.

Feed fingers 37 will be selectively set in position to feed the size of documents desired and the remaining feed fingers moved into retracted position. The various cranks have the links adjusted for the desired amount of feed of the sensitized strip and the document with the spool engaging members adjusted to center the spools between the side frame members and the guides for the strip adjusted in proper position. Then, for each depression of main control bar 98 a document is fed into photographing position on the copy table, the sensitized strip is fed to bring an unexposed portion into photographing position and the punch and photographing means is operated to photograph the document in completing one cycle of operation. Documents are fed subsequently from the forward end of the feed table between the side guides into position to be picked up by feed fingers 37 and fed into and through the photographing position with operation of control bar 98 to obtain subsequent cycles of operation of the machine for successively photographing successive documents. If the documents can be fed at the front of the copy table fast enough by an operator using both hands and operating the micro-switch with the knee pad instead of control bar 98, holding the switch engaged continuously will secure continuous operation of the machine for feeding and photographing documents. A good operator can continuously feed documents of the various sizes mentioned into the machine during continuous operation thereof for various periods of time.

When duplicate photographic copies of documents are desired for any of the different sizes with the copy table in front feed position, it is necessary for the operator to manually operate manually operable lever 87 to disengage shoulder 92 from pin 86 thereby disengaging the clutch and stopping the copy feed mechanism while the drive unit may continue to operate the sensitized strip, punch and photographing means for producing as many copies of the document as may be desired through the operation of control bar 98 in the usual manner. When the desired number of copies have been made holding lever 94 is operated to release manually operable lever 87 and allow it to return into its normal operating position where shoulder 92 engages pin 86 and the clutch mechanism is engaged for operating sprocket shaft 40 and feed fingers 37 to feed documents over copy plate 25.

In setting up the machine for any of these photographing operations it will be appreciated that the copy table may have its position adjusted longitudinally and laterally on the base by the operation of the various adjustments of the copy table mounting structure hereinbefore described. The copy table can also be raised or lowered relative to the lens unit 134 and the prism 135 so that copies at unity may be brought into proper focus on the ground glass plate of the photographing machine by viewing the image of the copy and adjusting the focus through opening a door in the rear wall of the photographing machine housing, not shown in the drawing.

The provision of a copy table with a document feed for feeding documents in one direction from the front to the rear end of the copy table and its mounting for positioning in either front or side feed position, provides a document photographing machine that will photograph a large variety of document sizes normally used in business for rapidly producing one or more copies thereof in an efficient manner and at low cost. The ability to shift the copy table from the front to the side feed position materially increases the ability of the machine disclosed herein to handle and produce a greater variety of photographic copies of documents than has heretofore been possible with machines that are not capable of being operated in the manner of the present invention. The structural cooperation between the copy table, the copy table mounting, and the drive means facilitates the shifting of the copy table from the front feed position to the side feed position without disassembling and reconstructing the machine in making the shift and without disconnecting the various assemblies of the machine from one another. The change in setting up of the copy table from the front feed position to the side feed position, or for changing the position of the parts from taking pictures of one size of documents to that of another size of documents, is facilitated by the cooperative features of construction of the copy table and the copy table mounting with the drive means and the mounting of the photographing means on the gate carried by photographing machine housing. The provision of the gate structure shown in the aforementioned application for opening up the front of the housing of the photographing machine to provide access to the various parts of the strip feeding mechanism also cooperates in facilitating the employment of the copy table herein disclosed for photographing the many different sizes of documents herein referred to.

It will be further understood that in addition to the document sizes above mentioned many different intermediate sizes of documents may be photographed by setting the machine up for strip feed and document feed corresponding to the results desired, the examples given being mentioned for the purpose of illustration of some of the varieties of commercial document sizes in common use that are readily photographed by the operation of this machine to produce one or more duplicate copies of the documents, as desired. Considerable economy is effected in the use of sensitized paper due to the photographing of the documents close together thereon so there is little waste of sensitized paper between the photographic images of documents.

The invention claimed is:

1. A copy feed for document photographing machines comprising an upright supporting member, and a copy table having a frame mounted on the upper end of said supporting member, a copy plate mounted on the top of said frame formed with a plurality of spaced parallel longitudinal slots, a plurality of sets of retractable feed fingers, each set having feed fingers operable in each of said slots in said copy plate, finger mounting means on said frame for mounting said sets of feed fingers in spaced relation for movement in one direction in the slots in said copy plate with an end of each finger normally projecting above said copy plate for engaging and feeding documents successively in one direction over said copy plate, said fingers being individually and manually retractable into an inoperative position, remotely located drive means, and adjustable means operated by said drive means for moving said finger mounting means in one direction for operating said fingers to feed documents whereby the retractability of said feed fingers provides for the accommodation of different sized documents and the adjustable means selectively varies the feeding movement of the operative fingers relative to the document size.

2. A copy feed for document photographing machines comprising an upright supporting member, a copy table having a frame mounted on said upright member, a copy plate mounted on said frame having a plurality of longitudinally extending spaced parallel slots, a plurality of sets of manually retractable feed fingers having one finger of each set operable in one of said slots, finger mounting and guide means mounted on said copy table carrying all of said sets of fingers for operation in said slots to engage and feed documents over said copy plate, each of said fingers being manually retractable into inoperative position, drive means for operating said fingers to feed documents, and selective means for adjusting the length of feeding movement of said feed fingers.

3. A copy feed for document photographing machines comprising a copy table having a frame, a copy plate mounted on said frame having a plurality of spaced parallel longitudinal slots, a plurality of sets of manually retractable feed fingers having free ends normally projecting through said slots for engaging and feeding documents on said copy plate, finger mounting and guide means carried by said copy table and mounting all of said sets of fingers for successive movement in said slots in one direction, continuously rotating drive means, and adjustable means connected to and driven by said drive means for converting continuous rotative movement into intermittent predetermined lineal movement, said last-mentioned means being connected to intermittently move said fingers for feeding documents intermittently in accordance with the size thereof, said fingers being manually and selectively retractable for feeding documents of varying size.

4. A copy feed for document photographing machines comprising a copy table having a frame, a copy plate mounted on said frame having a plurality of spaced parallel slots, a plurality of sets of retractable feed fingers, each finger being manually retractable into inoperative position and normally having a free end projecting through one of said slots in said copy plate for engaging a document to be fed, endless flexible members carrying said fingers in spaced relation for lineal movement to move said fingers successively along said slots in one direction, means carried by said frame supporting said endless members for lineal movement, rotary drive means, and motion converting means connecting said rotary drive means and endless member supporting means adjustable for intermittently moving said endless members and fingers varying amounts according to adjustment to intermittently feed documents of varying size an amount equal to and greater than document size in the operation thereof by said rotary drive means.

5. A copy feed for document photographing machines comprising a copy table having a frame, a copy plate mounted on said frame having a plurality of spaced parallel slots, a plurality of sets of retractable feed fingers, each finger normally projecting through one of said slots for engaging and feeding a document over said copy plate and being manually retractable into inoperative position, a pair of shafts rotatably mounted in said frame in transversely extending relation, endless feed members, one for each of said sets of feed fingers and operably carried by said shafts for lineal movement in the rotation of said shafts for operating said fingers in the movement thereof to feed documents, rotary drive means having a shaft rotatable in said frame, a crank arm on the shaft of said rotary drive means, an oscillating device mounted on said frame formed for engaging and rotating one of said pair of shafts in movement in one direction for feeding documents, brake means for normally holding said pair of shafts against rotation but insufficient to hold said shafts when operated by said drive means, adjustable link means connected to said oscillating device and to said crank arm for transmitting the rotary motion of said drive means to oscillate said oscillating device in variable amounts equal to or greater than the size of the respective documents.

6. A copy feed for document photographing machines comprising a copy table having a frame, a copy plate mounted on said frame formed with a plurality of spaced parallel slots, a plurality of sets of retractable feed fingers, each finger being manually retractable into inoperative position and normally having a free end for projecting through one of said slots to engage and feed a document in operation thereof, supporting means mounting said feed fingers for movement in one direction in an endless path having one portion parallel to the slotted portion of said copy plate for feeding documents in one direction over said copy plate, said supporting means having a driven part with connections for moving said feed fingers in the operation thereof, an oscillating member formed for engaging said driven part intermittently for moving it variable amounts in one direction, continuously rotating drive means, motion converting means connecting said drive means with said oscillating member for converting rotary to oscillating motion for oscillating said oscillating member including adjustable means for selectively varying the oscillating stroke of said oscillating member, and manually operable control means for said drive means for obtaining a cycle of operation of said copy feed in each operation thereof in which said supporting means is operated an amount sufficient for intermittently feeding documents across said copy plate into one of a series of predetermined successive positions.

7. A copy feed for document photographing machines comprising a copy table having a frame, a copy plate mounted on said frame formed with a plurality of spaced parallel slots, a plurality of sets of retractable feed fingers, each finger being manually retractable into inoperative position and normally having a free end for projecting through one of said slots to engage and feed a document in operation thereof, supporting means mounting said feed fingers for movement in one direction in an endless path having one portion parallel to the slotted portion of said copy plate for feeding documents in one direction over said copy plate, said supporting means having a driven part with connections for moving said feed fingers in the operation thereof, an oscillating member formed for engaging said driven part intermittently for moving it variable amounts in one direction, operating means for oscillating said oscillating member including adjustable means for selectively varying the oscillating stroke thereof relative to the size of the documents, and manually operable control means having the manually operable parts thereof carried by said copy table for securing a cycle of operation of said copy feed by said operating means in each manual operation for intermittently feeding documents over said copy plate from one position to another adjacent position in a series of predetermined positions for documents on said copy plate.

8. A copy feed for document photographing machines comprising a copy table having a frame, a copy plate mounted on said frame having a plurality of spaced parallel longitudinal slots, a plurality of sets of retractable feed fingers having free ends normally projecting through said slots for engaging and feeding documents on said copy plate, finger mounting and guide means carried by said copy table and mounting all of said sets of fingers for successive movement in said slots in one direction, continuously rotating drive means and adjustable means driven by said drive means for converting continuous movement into intermittent movement connected to intermittently move said fingers varying amounts for feeding documents intermittently the amount of feed being determined by the setting of said adjustable means, said fingers being manually retractable for selective use in feeding documents of varying size, and manually operable control means carried by said copy table for securing one cycle of operation by said drive member to feed a document into one of a series of successive positions across said copy plate.

9. A copy feed for document photographing machines comprising a copy table having a frame, a copy plate mounted on said frame formed with a plurality of spaced parallel slots, a plurality of sets of retractable feed fingers, each finger being manually retractable into inoperative position and normally having a free end for projecting through one of said slots to engage and feed a document in the movement thereof along the slots, adjustable means for intermittently moving said fingers variable amounts in one direction in said slots for feeding documents of varying sizes over said copy plate, a platen mounted for movement toward and from said copy plate for engaging and holding documents against said copy plate during intervals in movement thereof by said feed fingers, and means for moving said platen away from said copy plate during movement of said feed fingers operated by said finger moving means in timed relation with the movement of said fingers.

10. A copy feed for document photographing machines comprising a copy table having a frame and a copy plate thereon formed with a plurality of spaced parallel slots, a plurality of sets of manually retractable feed fingers, each finger being retractable into inoperative position and normally having a free end projecting through one of said slots to engage and feed a document in the movement thereof along said slots, a platen movably mounted on said copy table for movement toward and from said copy plate to hold documents against said copy plate in one position thereof, adjustable means for intermittently moving said feed fingers variable amounts relative to the sizes of the documents to feed said documents over said copy plate and move said platen in timed relation away from said copy plate during movement of said feed fingers, and manually operable control means for said last-mentioned means adapted to secure one cycle of operation of said last-mentioned means in each operation thereof to feed a document into one of a series of successive positions on said copy plate in said intermittent operation of said feed fingers.

11. A copy feed for document photographing machines comprising a copy table having a frame, a copy plate mounted on said frame having a plurality of spaced parallel slots, a plurality of sets of retractable feed fingers, each finger being manually retractable into inoperative position, each of said fingers normally having a free end projecting through one of said slots in said copy plate for engagement with a document in feeding a document across said copy plate in cooperation with other fingers, finger mounting and guide means mounted on said copy table operably carrying all of said fingers, rotary drive means on said copy table, drive connecting means on said table connected with said rotary drive means and said finger mounting and guide means having relatively movable cooperating parts to convert rotary motion to intermittent lineal motion in one direction including means for selectively adjusting the length of the intermittent lineal motion to provide an intermittent variable movement of said feed fingers for intermittently feeding documents of varying size intermittently across said copy plate in amounts equal to or greater than the size of each document.

AMBROSIUS BRIECHLE.

REFERENCES CITED

The following references are of record in the file of this patent:

UNITED STATES PATENTS

| Number | Name | Date |
|---|---|---|
| 1,066,115 | Johnson | July 1, 1913 |
| 1,255,032 | McMillan | Jan. 29, 1918 |
| 1,778,433 | Saatman | Oct. 14, 1930 |
| 1,780,049 | Troyer | Oct. 28, 1930 |
| 1,908,921 | Rosenthal | May 16, 1933 |
| 1,948,142 | Swift | Feb. 20, 1934 |
| 1,970,381 | Landrock | Aug. 14, 1934 |
| 2,001,598 | Caps et al. | May 14, 1935 |
| 2,385,581 | Kury | Sept. 25, 1945 |